United States Patent
Lear

(10) Patent No.: US 11,115,266 B2
(45) Date of Patent: Sep. 7, 2021

(54) PRIORITY BASED SELECTION OF TIME SERVICES

(71) Applicant: Cisco Technology, Inc., San Jose, CA (US)

(72) Inventor: Eliot Lear, Wetzikon (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/296,434

(22) Filed: Mar. 8, 2019

(65) Prior Publication Data

US 2020/0287784 A1 Sep. 10, 2020

(51) Int. Cl.
*H04L 12/24* (2006.01)
*H04L 29/08* (2006.01)
*H04L 12/18* (2006.01)
*H04L 29/12* (2006.01)

(52) U.S. Cl.
CPC .......... *H04L 41/0806* (2013.01); *H04L 12/18* (2013.01); *H04L 61/2015* (2013.01); *H04L 67/104* (2013.01)

(58) Field of Classification Search
CPC ................ H04L 41/0806; H04L 12/18; H04L 61/2015; H04L 67/104
See application file for complete search history.

(56) References Cited

U.S. PATENT DOCUMENTS

| 2005/0102586 | A1* | 5/2005 | Chiu | G06F 11/1604 714/56 |
| 2009/0010174 | A1* | 1/2009 | Dessertenne | H04L 43/50 370/250 |
| 2011/0022242 | A1* | 1/2011 | Bukhin | G06F 1/3234 700/291 |
| 2011/0110360 | A1* | 5/2011 | Fenwick | G06F 1/14 370/350 |
| 2014/0167958 | A1* | 6/2014 | Kimchi | A01K 29/005 340/539.13 |
| 2015/0256874 | A1* | 9/2015 | Kim | H04N 21/4302 725/151 |
| 2018/0069684 | A1* | 3/2018 | Ziren | H04L 5/14 |

OTHER PUBLICATIONS

Geoff Huston, APNIC, "Protocol Basics: The Network Time Protocol—The Internet Protocol Journal, vol. 15, No. 4", https://www.cisco.com/c/en/us/about/press/internet-protocol-journal/back-issues/table-contents-58/154-ntp.html, Dec. 2012, 6 pages.
David L. Mills, "A Brief History of NTP Time: Confessions of an Internet Timekeeper", https://www.eecis.udel.edu/~mills/database/papers/history.pdf, downloaded Jan. 1, 2019, 10 pages.

(Continued)

*Primary Examiner* — Joshua D Taylor
(74) *Attorney, Agent, or Firm* — Edell, Shapiro & Finnan, LLC

(57) ABSTRACT

In an embodiment, a method comprises at a network device in an enterprise network, selecting one or more time servers used for establishing a timing reference according to a predetermined priority order of selection that begins with determining whether the network device is configured with information indicating one or more time servers to be used. A timing reference is established for the network device based on a selected time server.

20 Claims, 9 Drawing Sheets

(56) References Cited

OTHER PUBLICATIONS

Cisco, "Cisco Guide to Harden Cisco IOS Devices", Document ID:13608, https://www.cisco.com/c/en/us/support/docs/ip/access-lists/13608-21.html, Sep. 25, 2018, 70 pages.

Konrad Defranceschi, "NTP Server via DHCP Server", Cisco Community, May 3, 2012, 5 pages.

* cited by examiner

PRIORITY BASED SELECTION OF TIME SERVICES

TECHNICAL FIELD

The present disclosure relates to selection of time services for network devices.

BACKGROUND

Network devices may be manually configured by a network administrator or other user to use a time server(s) as a source of time information. Various protocols have been established that allow for communication of the time information between network devices and time servers.

DESCRIPTION OF EXAMPLE EMBODIMENTS

Overview

Figure 1:
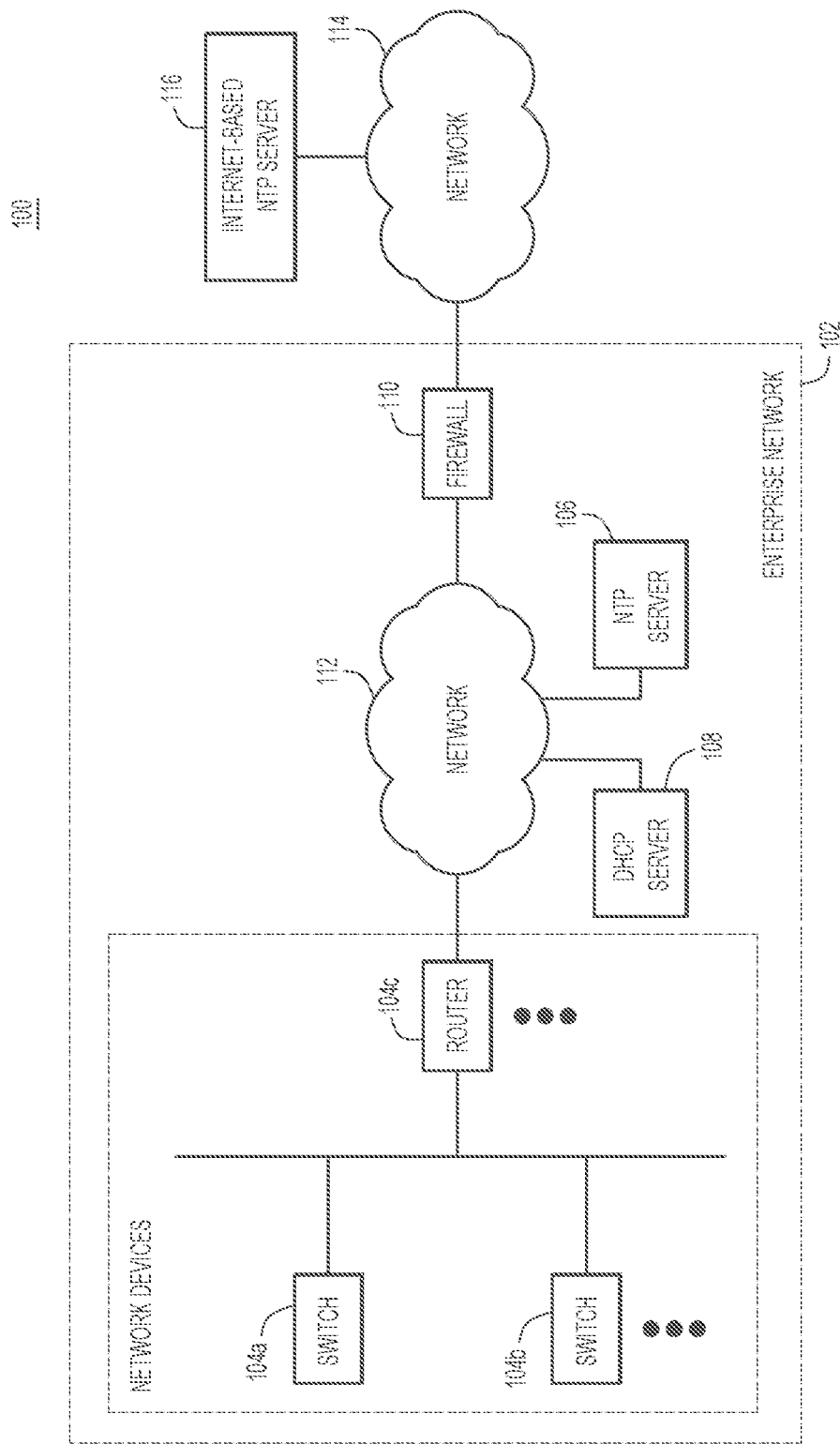
FIG. 1 is a diagram illustrating a network environment in which priority based time services selection techniques presented herein may be implemented, according to an example embodiment.

In accordance with one embodiment, a priority based time services selection method is provided. The method includes, at a network device in an enterprise network, selecting one or more time servers used for establishing a timing reference according to a predetermined priority order of selection. The predetermined priority order of selection begins with determining whether the network device is configured with information indicating one or more time servers to be used. The method further includes establishing a timing reference for the network device based on a selected time server.

Example Embodiments

A network administrator (or other user) may be responsible for manually configuring a network device to use time server(s) for establishing a timing reference for the network device. For example, a network administrator of an enterprise network may manually configure each device in the enterprise network to use pre-identified time server(s) as a source of a timing reference. The time server(s) selected by the network administrator may be under the control of the enterprise, or may be under the control of a third-party and connectivity is provided to such a third-party time server via the Internet.

Over time, the time server(s) used by the network devices can change, which may require reconfiguration of the network devices that were configured to use the time server(s) prior to the change. For example, a network reconfiguration may result in a change of an Internet Protocol (IP) address of the time server, and any network device that is configured to use that time server may then need to be manually re-configured in view of the time server IP address change.

Moreover, it may be desirable to use particular time servers for a number of reasons, such as, for example, network/network device performance, control, cost, security, trust, etc. For example, there may be trust issues associated with using public or Internet time servers.

Techniques are presented herein for prioritizing the selection of time servers to be used for establishing a timing reference for one or more network devices in an enterprise network. The selection of time servers is conducted according to a predetermined priority order of selection, thereby obviating the need for a network administrator to manually re-configure the network devices. For example, the predetermined priority order of selection may proceed according to the following order or sequence: (1) select an network time protocol (NTP) time server within the enterprise network that is identified by information configured on the network device; (2) select an NTP time server that is used by a network management protocol service (e.g., Dynamic Host Configuration Protocol (DHCP)) of a network management protocol (e.g., DHCP) server within the enterprise network; (3) select an NTP time server that is identified from information provided in a response to a multicast request for a NTP service that is sent by the network device into the enterprise network using multicast domain name service (mDNS) or DNS-service discovery (mDNS/DNS-SD); (4) select an NTP time server that is identified from information provided in a response to a link layer discovery protocol (LLDP) request for NTP service that is sent by the network device into the enterprise network; (5) use an NTP server provided by an Internet NTP service; and (6) listen for NTP packets sent via multicast into the enterprise network by a peer network device. The order or sequence described above is only an example. It is to be understood that the predetermined priority order of selection may vary and may proceed according to any suitable order or sequence. As such, the predetermined priority order may proceed according to an order or sequence that includes some or all additional/alternative time services selection mechanisms that are different than those described above and/or that includes some or all of the time services selection mechanisms described above but in a different order or sequence than that described above.

With reference made to FIG. 1, a diagram is shown of a network environment 100 in which techniques presented herein may be implemented, according to an example embodiment. The network environment includes an enterprise network 102. The enterprise network 102 includes numerous network devices such as switches 104a and 104b and router 104c in a simplified scenario, a network time protocol (NTP) server 106, a DHCP server 108, and a firewall 110. Network 112 represents additional network devices that enable communication between the various devices and entities in the enterprise network 102.

Network 112 may be any suitable network or combination of one or more networks, a wide area network (WAN), an intranet, a virtual network, a wired network, a wireless network, and/or any other suitable architecture or system. In FIG. 1, network 112 is shown as a single network for simplicity. However, it is to be understood that in some embodiments, network 112 may include a combination networks. Network 112 may also provide access to the Internet 114, for example, via one or more external networks. One or more Internet-based NTP servers 116 may be provided and may be accessible to the network devices, such as switch 104a, switch 104b and router 104c.

The network devices, such as switch 104a, switch 104b and router 104c, may be any suitable device configured to process data and communicate via one or more networks, such as routers, switches, gateways, etc., and they may take the form of physical or virtual devices.

As described above in the example embodiment, each of the network devices, such as switch 104a, switch 104b and router 104c may be configured to establish a timing reference based on one or more time servers used for establishing a timing reference. The one or more time servers may be selected according to a predetermined priority order of selection, such as the order of selection described above. The predetermined priority order of selection dictates which one or more services/protocols and in what order the one or more services/protocols are to be employed to attempt to select one or more time servers. As described above, the network devices, such as switch 104a, switch 104b and router 104c, may be configured to select one or more time servers to establish a timing reference based on communication with, for example, the NTP server 106, the DHCP server 108, and/or the Internet-based NTP server 116. Access lists associated with the network devices of the enterprise network may be configured/re-configured so as not to prevent the presented techniques from being invoked.

Figure 2:
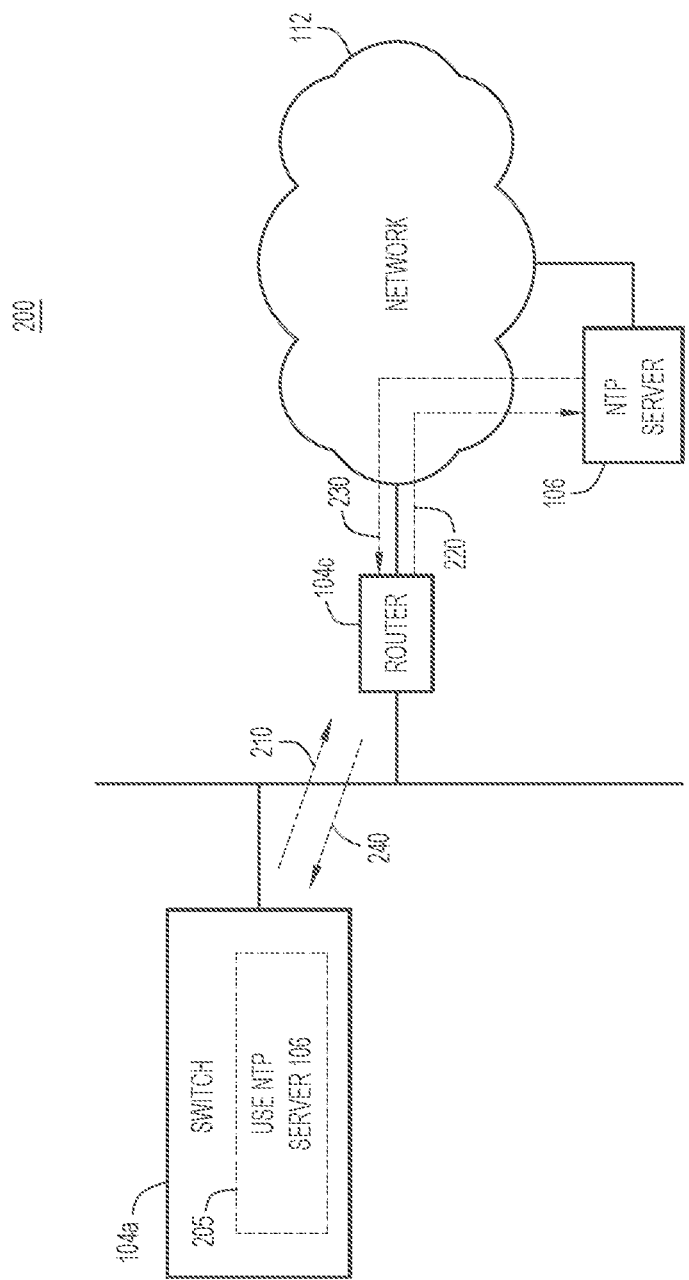
FIG. 2 is a diagram illustrating a portion of the network environment of FIG. 1 showing a first highest priority time services selection mechanism, according to an example embodiment.

Referring next to FIG. 2, shown is a diagram illustrating a portion of the network environment of FIG. 1 showing a first highest priority time services selection mechanism 200, according to an example embodiment. As indicated above, the predetermined priority order of selection may begin with a determination as to whether a network device is configured with information identifying one or more time servers within the enterprise network that are to be used for establishing the timing reference. If the network device is configured with this identification information, then the network device communicates with that particular time server in order to establish the timing reference via, for example, an NTP service, and the process ends.

In the example shown in FIG. 2, the switch 104a is configured with information 205 identifying the NTP server 106 as a time server to be used by the switch 104a for establishing a timing reference. As such, the switch 104a communicates with the NTP server 106 to establish the timing reference. For example, based on information stored in the switch 104a, at 210 and 220 the switch 104a sends a request via the router 104c and the network 112 to the NTP server 106. The request is for the NTP server 106 to provide time information. The NTP server 106 sends a response at 230 to the request via the network 112 and the router 104c to the switch 104a. The router 104c, at 240, returns the time information to the switch 104a. Based on the time information included in the response from the NTP server 106, the switch 104a establishes the timing reference.

Figure 3:
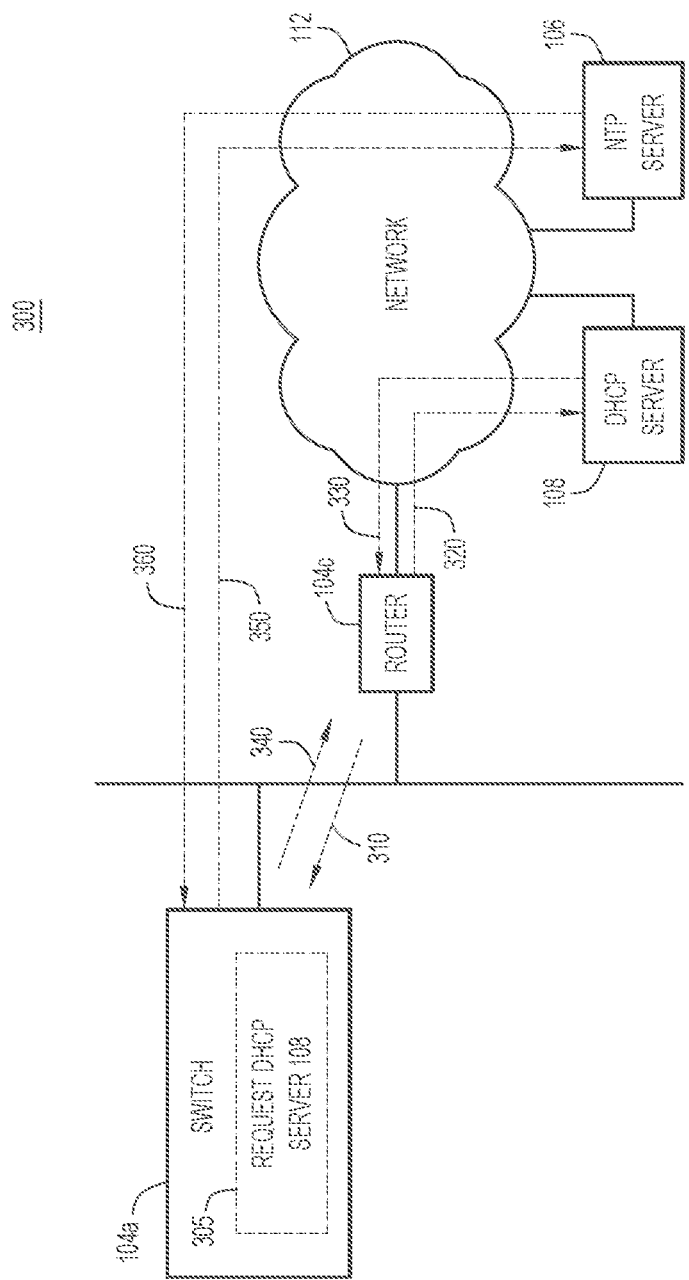
FIG. 3 is a diagram illustrating a portion of the network environment of FIG. 1 showing a second highest priority time services selection mechanism, according to the example embodiment.

Referring next to FIG. 3, shown is a diagram illustrating a portion of the network environment of FIG. 1 showing a second highest priority time services selection mechanism 300, according to the example embodiment. The second highest priority time services selection mechanism is invoked if the first priority time services selection mechanism is not available or fails. The second priority time services selection mechanism involves sending a request to a network management protocol server for time server identification information of a time server used by the network management protocol server. If the network device receives a response to this request, then the network device communicates with the identified time server in order to establish the timing reference.

In the example shown in FIG. 3, the switch 104a is not configured with information identifying one or more time servers that are to be used for establishing the timing reference, thus the first priority time services selection mechanism is not available to the switch 104a. In order to obtain the time server identification information, the switch 104a has information 305 indicating that it is to communicate with the DHCP server 108. For example, at 310 and 320, the switch 104a sends a request for time server identification information via the router 104c and the network 112 to the DHCP server 108. The request may be a DHCP request and may include an NTP option. The NTP option may be indicative of a request for the DHCP server 108 to provide time server identification information in a DHCP response to the switch 104a. At 330, the DHCP server 108 sends a response to the request via the network 112 and the router 104c at 340 returns the response to the switch 104a. At 350, the switch 104a then communicates with the identified time server, shown as NTP server 106 in FIG. 3, and the NTP server 106 at 360 returns time information to the switch 104a to enable the switch 104a to establish the timing reference.

Figure 4:
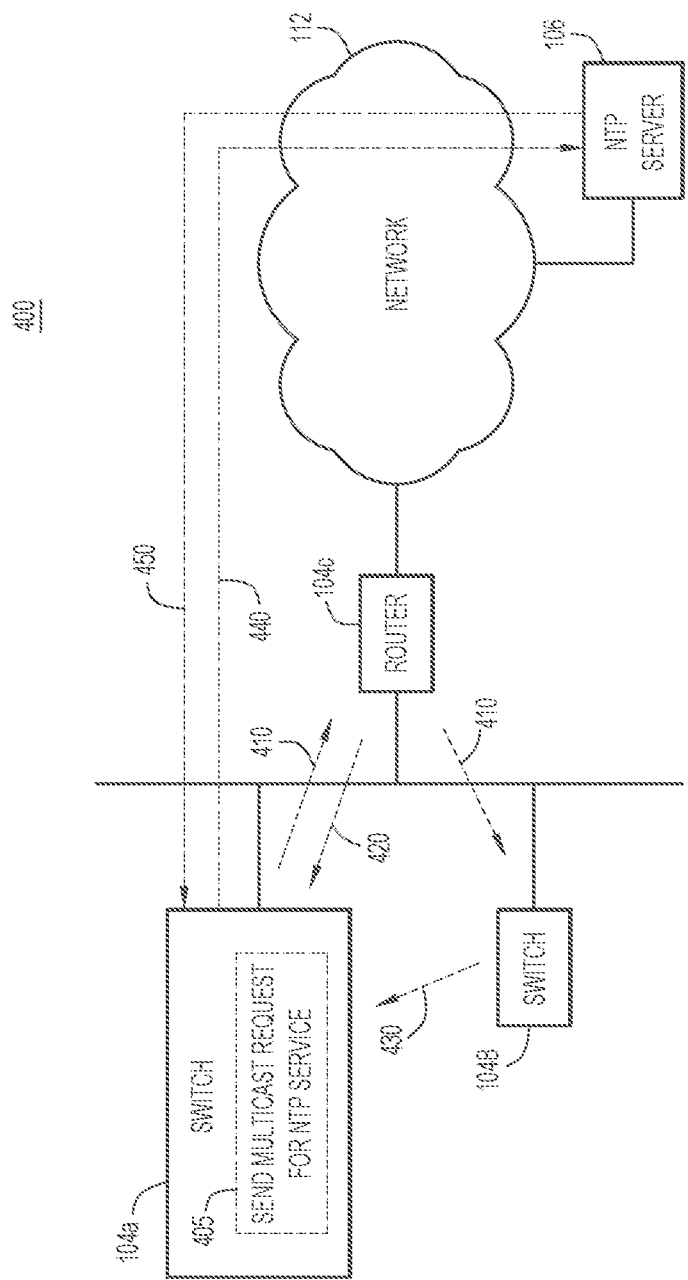
FIG. 4 is a diagram illustrating a portion of the network environment of FIG. 1 showing a third highest priority time services selection mechanism, according to the example embodiment.

Referring next to FIG. 4, shown is a diagram illustrating a portion of the network environment of FIG. 1 showing a third highest priority time services selection mechanism 400, according to the example embodiment. The third highest priority time services selection mechanism is invoked if both the first and second highest priority time services selection mechanisms are not available or fail. The third highest priority time server selection mechanism involves sending into the enterprise network a multicast request for a network time protocol service. If the network device receives a response to the multicast request that includes information indicating/identifying a time server, then the network device communicates with the indicated time server in order to establish the timing reference.

In the example shown in FIG. 4, the switch 104a is not configured with information identifying one or more time servers that are to be used for establishing the timing reference, thus the first priority time services selection mechanism is not available to the switch 104a. Further, the switch 104a does not have information indicating that it is to communicate with a network management protocol server to receive time server identification information of a time server used by the network management protocol server; therefore, the second priority time services selection mechanism is not available to the switch 104a. The switch 104a has information 405 indicating that it is to send a multicast request for a network time protocol service into the enterprise network. The multicast request is to be sent to a group of intended network devices that includes, in this example, the switch 104b and the router 104c. The information 405 may identify a multicast address (e.g., an IP address) that is to be used for sending the multicast request to the group of intended network devices.

For example, based on the information 405, at 410 the switch 104a sends into the enterprise network a multicast request for a network time protocol service. The multicast request may be sent using the mDNS protocol or the DNS-SD protocol. In this example, the multicast request is received by the router 104c and the router 104c copies the request and forwards it to the switch 104b. At 420, the router 104c sends a response to the multicast request. At 430, the switch 104b sends a response to the multicast request. The responses sent by the router 104c and the switch 104b, for example, may be a unicast response or a multicast response. For example, the unicast response may be sent to the switch 104a based on information included in the request that identifies the switch 104a as the source of the request. Information may be included in the responses 420 or 430 that includes an identification of a time server, such as NTP server 106.

At 440, the switch 104a then communicates with the time server (indicated in the response from the router 104c and/or the switch 104b), such as NTP server 106 in FIG. 4, and the NTP server 106 at 450 returns time information to the switch 104a to enable the switch 104a to establish the timing reference.

Figure 5:
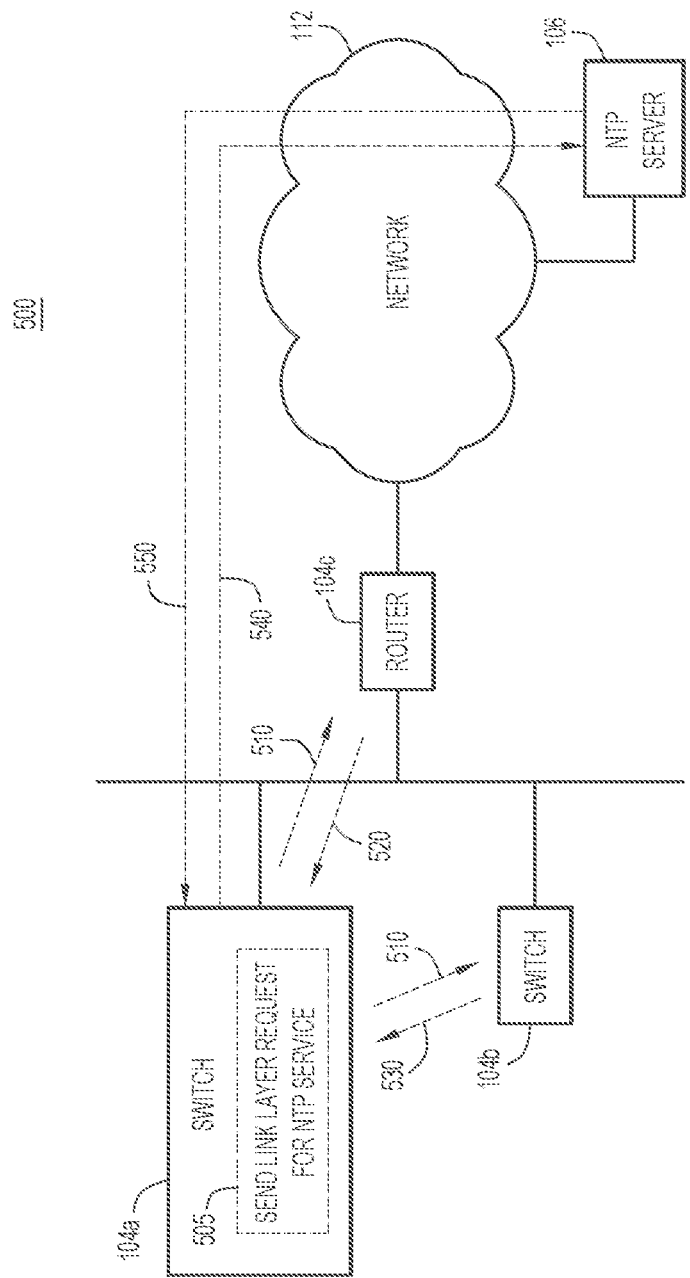
FIG. 5 is a diagram illustrating a portion of the network environment of FIG. 1 showing a fourth highest priority time services selection mechanism, according to the example embodiment.

Referring next to FIG. 5, shown is a diagram illustrating a portion of the network environment of FIG. 1 showing a fourth highest priority time services selection mechanism 500, according to the example embodiment. The fourth highest priority time services selection mechanism is invoked if the first, second, and third highest priority time services selection mechanisms are not available or fail. The fourth highest priority time services selection mechanism involves sending a link layer request into the enterprise network for a network time protocol service. If the network device receives a response to the link layer protocol request that includes information indicating/identifying a time server, then the network device communicates with the indicated time server in order to establish the timing reference.

In the example shown in FIG. 5, the first, second, and third highest priority time services selection mechanisms were unavailable to the switch 104a or these selection mechanisms failed when they were invoked by the switch 104a. In order for the switch 104a to obtain the information indicating the time server, the switch 104a has information 505 indicating that it is to send a link layer request for a network time protocol service into the enterprise network. The link layer request may be, for example, a Link Layer Discovery Protocol (LLDP) request, a Cisco Discovery Protocol (CDP) request, etc. For example, based on the information 505, at 510 the switch 104a sends into the enterprise network a link layer request for a network time protocol service. In this example, the link layer request is received at the switch 104b and at the router 104c. At 520, the router 104c sends a response to the link layer request, the response including information identifying a NTP server, such as NTP server 106. At 530, the switch 104b sends a response to the link layer request. Information may be included in the responses 520 or 530 that includes an identification of a time server, such as NTP server 106. At 540, the switch 104a then communicates with the indicated time server, shown as NTP server 106 in FIG. 5, and the NTP server 106 at 550 returns time information to the switch 104a to enable the switch 104a to establish the timing reference.

Figure 6:
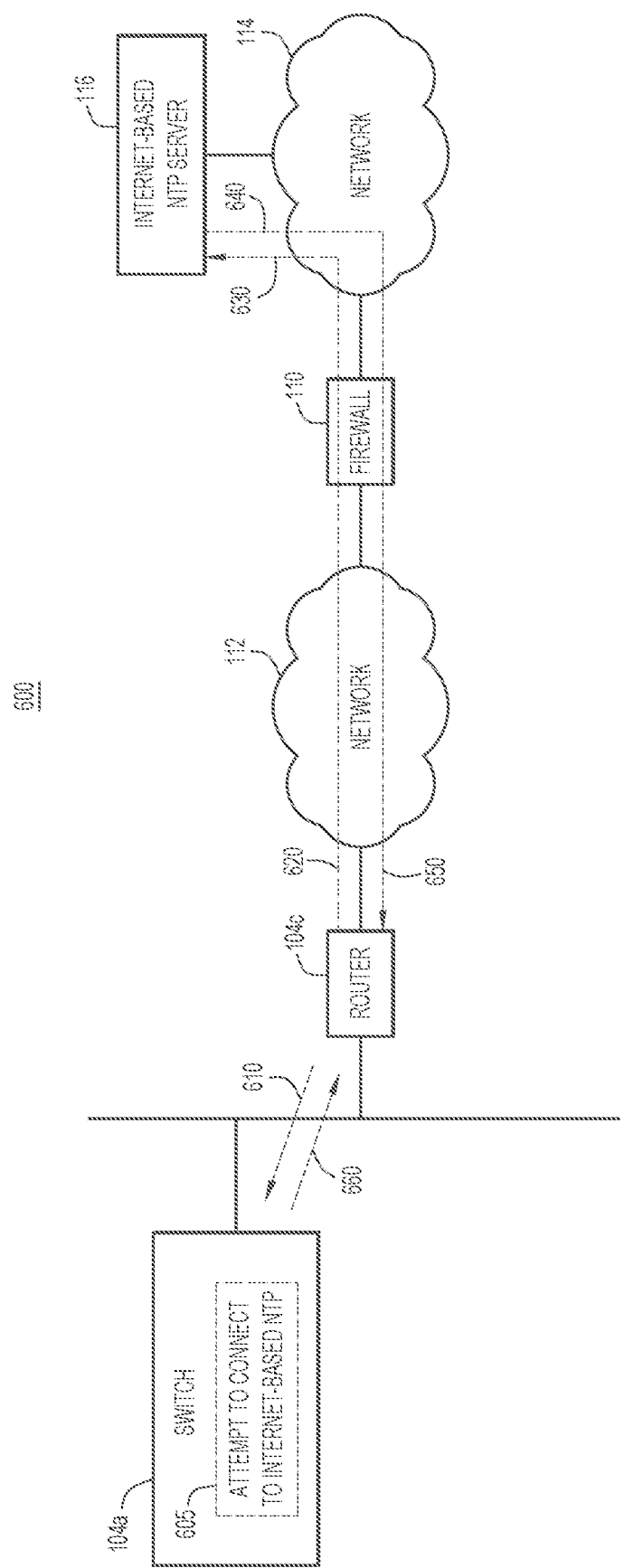
FIG. 6 is a diagram illustrating a portion of the network environment of FIG. 1 showing a fifth highest priority time services selection mechanism, according to the example embodiment.

Referring next to FIG. 6, shown is a diagram illustrating a portion of the network environment of FIG. 1 showing a fifth highest priority time services selection mechanism 600, according to the example embodiment. The fifth highest priority time services selection mechanism is invoked if the first, second, third, and fourth highest priority time services selection mechanisms are not available or fail. The fifth highest priority time services selection mechanism involves attempting to connect to an Internet-based NTP server. If the network device is able to connect to the Internet-based NTP server, then the network device communicates with the Internet-based NTP server in order to establish the timing reference.

In the example shown in FIG. 6, the first, second, third, and fourth highest priority time services selection mechanisms were unavailable to the switch 104a or these selection mechanisms failed when they were invoked by the switch 104a. The switch 104a has information 605 indicating that it is to attempt to connect to an Internet-based network time protocol server, such as NTP server 116. For example, based on the information 605 stored in the switch 104a, at 610, 620, and 630, the switch 104a sends via the router 104c, the network 112, the firewall 110, and the Internet 114, a request for time information to the Internet-based NTP server 116. At 640, the Internet-based NTP server 116 sends a response to the request via the Internet 114, and at 650 the response is passed from the firewall 110 via the network 112 to the router 104c. At 660, the router 104c returns time information to the switch 104a to enable the switch 104a to establish the timing reference.

Figure 7:
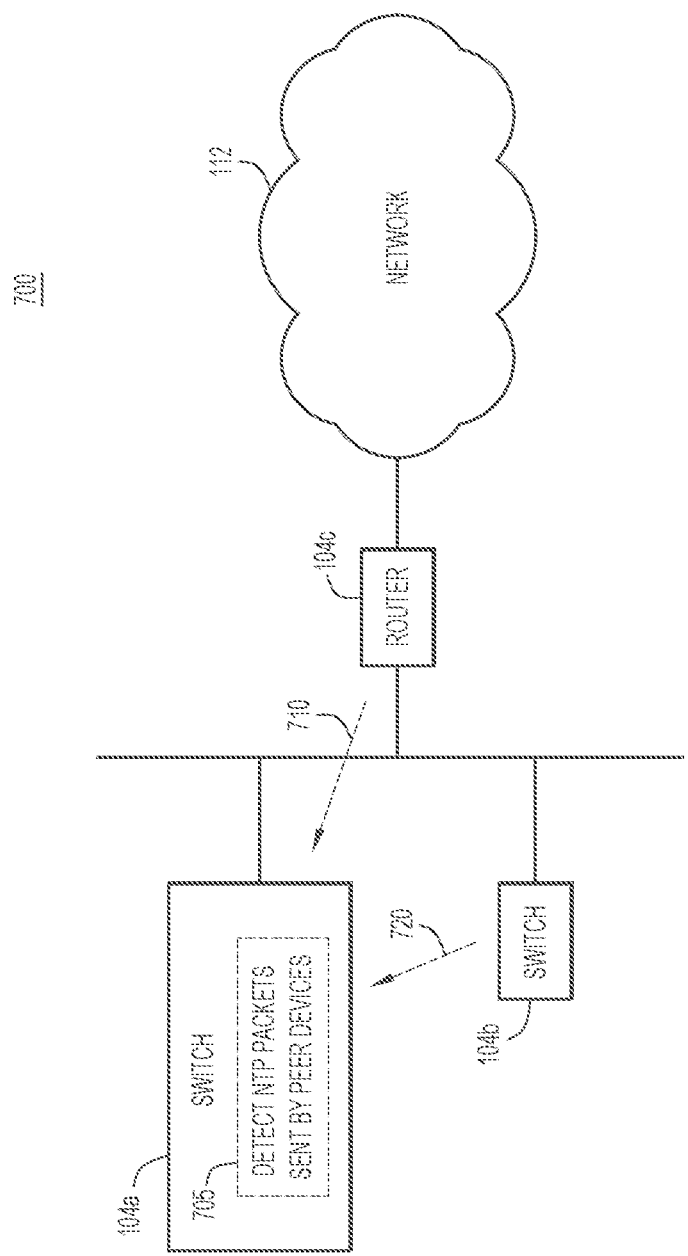
FIG. 7 is a diagram illustrating a portion of the network environment of FIG. 1 showing a sixth priority time services selection mechanism, according to the example embodiment.

Referring next to FIG. 7, shown is a diagram illustrating a portion of the network environment of FIG. 1 showing a sixth priority time services selection mechanism 700, according to the example embodiment. In the example embodiments presented herein, the time servers selection mechanism 700 is the lowest priority mechanism, and is invoked if the first, second, third, fourth and fifth highest priority time services selection mechanisms are not available or fail. The sixth priority time services selection mechanism involves detecting network time protocol packets sent via multicast into the enterprise network by peer network devices. If the detected network time protocol packets include the necessary time information, then the network device establishes the timing reference.

In the example shown in FIG. 7, the first, second, third, fourth, and fifth highest priority time services selection mechanisms were unavailable to the switch 104a or these selection mechanisms failed when they were invoked by the switch 104a. The switch 104a includes information 705 indicating that it is to detect network time protocol packets sent via multicast into the enterprise network by peer network devices. For example, at 710 and 720 the router 104c and the switch 104b respectively send via multicast network time protocol packets into the enterprise network. In this example, the router 104c and the switch 104b may each be configured as a simple network time protocol (SNTP) server and the switch 104a may be configured as an SNTP client. The switch 104a is enabled to establish the timing reference based on time information in the detected network time protocol packets. The switch 104a may establish the timing reference based on time information in the network time protocol packets sent by the router 104c and/or the switch 104b.

The selection process described above may be repeated (e.g., periodically) so that it can be determined whether a time services selection mechanism of a higher priority is available. If so, the higher priority selection mechanism may be invoked by the network device to establish the timing reference. For example, if a network device establishes a timing reference by invoking a third highest priority time services selection mechanism, then after a predetermined amount of time, the network device may invoke a higher priority selection mechanism (i.e., the first or second highest priority time services selection mechanisms), if available. Continuing with this example, if the higher priority selection mechanisms are not available or fail, the timing reference established by invoking the third highest priority may continue to be used (e.g., for a predetermined amount of time, or until a higher priority time services selection mechanism is successfully invoked to establish a timing reference).

Although a particular predetermined priority order of selection is described above for various selection mechanisms, those skilled in the art will understand that depending on, for example, the particular application or network, a different selection order and/or selection mechanisms may be employed.

Figure 8:
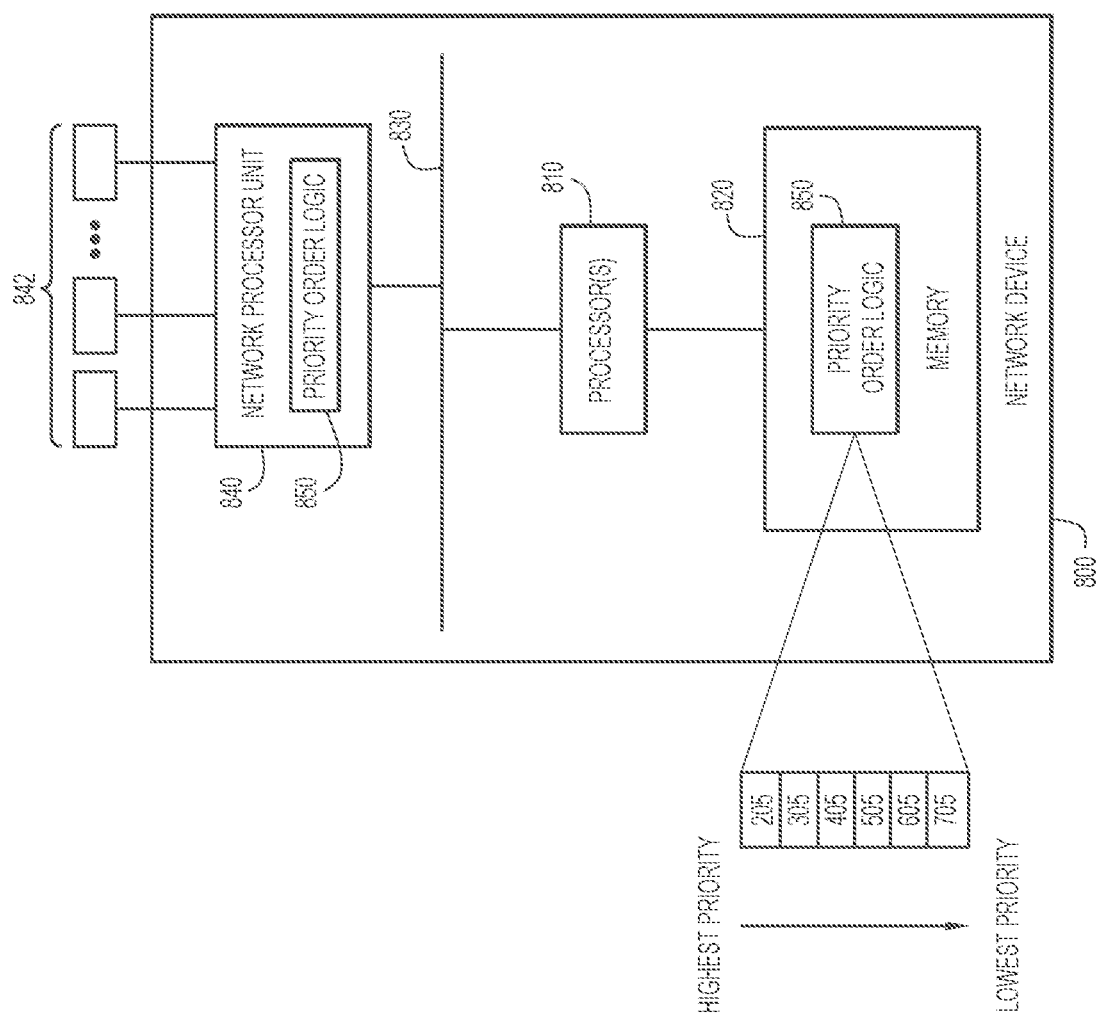
FIG. 8 is a block diagram of a network device configured to implement the priority based time services selection techniques presented herein, according to an example embodiment.

Referring next to FIG. 8, shown is a block diagram of a network device 800 configured to perform the operations described above and depicted in connection with FIGS. 1-7. The network device 800 includes one or more processors 810, memory 820, a bus 830, a network interface that includes a network processor unit 840 and a plurality of network ports 842. The processor 810 may be a microprocessor or microcontroller. The network processor unit 840 may include one or more Application Specific Integrated Circuits (ASICs), linecards, etc., and facilitates network communications between the network device 800 and other network devices.

The plurality of network ports 842 receives packets from a network and send packets into the network. The processor 810 executes instructions associated with software stored in memory 820. Specifically, the memory 820 stores instructions for priority order logic 850 that, when executed by the processor 810, causes the processor 810 to perform various operations on behalf of the network device 800 as described herein. It should be noted that in some embodiments, the priority order logic 850 may be implemented in the form of firmware implemented by one or more ASICs as part of the network processor unit 840.

The memory 820 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform the operations described herein.

As shown in FIG. 8, the priority order logic 860 may include the various time services selection configuration information 205, 305, 405, 505, 605, and 705 to indicate a priority selection order from highest priority (information 205) to invoke time services selection mechanism 200 first to lowest priority (information 705) to invoke time services selection mechanism 700 last, if all other mechanisms are not available or fail.

Figure 9:
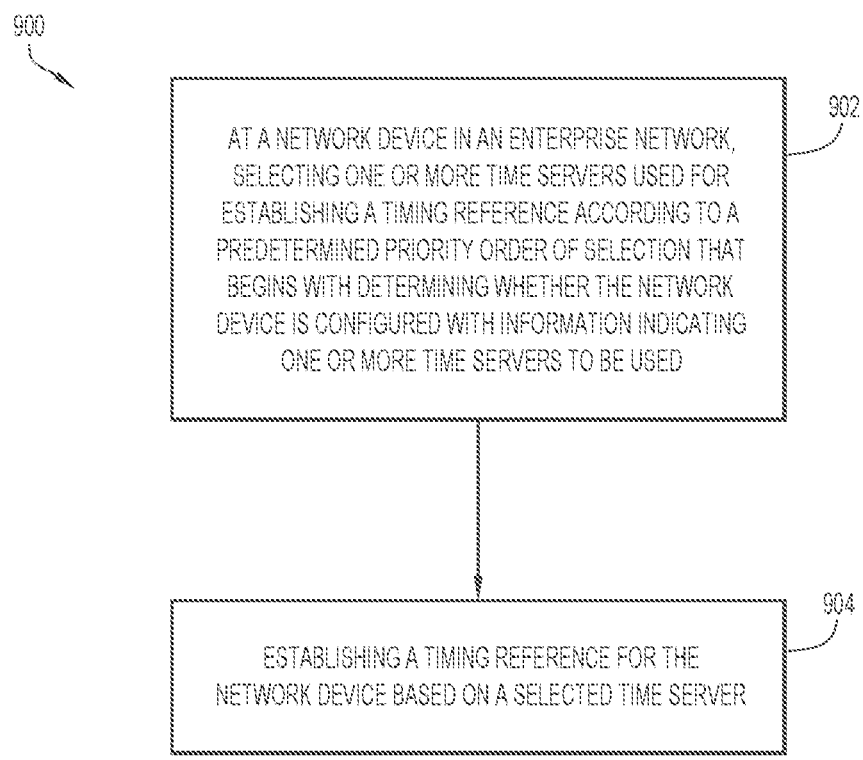
FIG. 9 is a flowchart of a priority based time services selection method, according to an example embodiment.

FIG. 9 is a flowchart illustrating a method 900. At 902, a network device in an enterprise network selects one or more time servers used for establishing a timing reference according to a predetermined priority order of selection that begins with determining whether the network device is configured with information indicating one or more time servers to be used. At 904, a timing reference for the network device is established based on a selected time server.

If the network device is not configured with information indicating one or more time servers, the network device may send a request through the enterprise network to a network management protocol server to receive time server identification information of one or more time servers used by the network management protocol server. If the server identification information is received, the network device may select at least one of the one or more time servers used by the network management protocol server. The network management protocol server may be Dynamic Host Configuration Protocol server, and the request may include a network time protocol server option.

If the network device is not successful at selecting a time server based on the network management protocol server, the network device may send into the enterprise network a multicast request for a network time protocol service. If a response to the multicast request is received by the network device, the network device may select a time server based on information contained in the response to the multicast request. The multicast request may be sent using the multicast Domain Name System (mDNS) protocol or the Domain Name System Service Discovery (DNS-SD) protocol.

If the network device is not successful at selecting a time server based on the multicast request, the network device may send into the enterprise network a link layer protocol request for a network time protocol service. If a response is received to the link layer protocol request, the network device may select a time server based on information contained in the response to the link layer protocol request. The link layer protocol request may be a Link Layer Discovery Protocol (LLDP) request or a Cisco Discovery Protocol (CDP) request.

If the network device is not successful at selecting a time server based on the link layer protocol request, the network device may attempt to connect to an Internet network time protocol server.

If the network device is not successful at connecting to the Internet network time protocol server, the network device may detect network time protocol packets sent via multicast into the enterprise network by one or more peer network devices.

If the network device is not configured with information indicating one or more time servers, the network device may send into the enterprise network a multicast request for a network time protocol service. If a response to the multicast request is received by the network device, the network device may select a time server based on information contained in the response to the multicast request.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a network device in an enterprise network, selecting one or more time servers, to use for establishing a timing reference for the network device, according to a predetermined priority order of selection that begins with determining whether the network device is configured with identification information indicating the one or more time servers to be used;
   in response to the network device not being configured with the identification information of the one or more time servers, communicating with a network management protocol server to obtain the identification information of the one or more time servers;
   in response to not obtaining the identification information from the network management protocol server, sending into the enterprise network a multicast request for a network time protocol service; and
   establishing the timing reference for the network device using a time server selected according to the predetermined priority order of selection.

2. The method of claim 1, wherein selecting according to the predetermined priority order of selection includes:
   if the network device is not configured with the identification information indicating the one or more time servers:
      sending a request through the enterprise network to the network management protocol server for the identification information of the one or more time servers used by the network management protocol server; and
      if the identification information of the one or more time servers used by the network management protocol server is received, selecting at least one of the one or more time servers used by the network management protocol server.

3. The method of claim 2, wherein the network management protocol server is Dynamic Host Configuration Protocol server, and the request includes a network time protocol server option.

4. The method of claim 2, wherein selecting according to the predetermined priority order of selection includes:
   if the network device is not successful at selecting the time server based on the multicast request:
      sending, into the enterprise network, a link layer protocol request for the network time protocol service; and
      if a response is received to the link layer protocol request, selecting the time server based on information contained in the response to the link layer protocol request.

5. The method of claim 4, wherein selecting according to the predetermined priority order of selection includes:
   if the network device is not successful at selecting the time server based on the link layer protocol request:
      attempting to connect to an Internet network time protocol server.

6. The method of claim 5, wherein selecting according to the predetermined priority order of selection includes:
   if the network device is not successful at connecting to the Internet network time protocol server:
      detecting network time protocol packets sent via multicast into the enterprise network by one or more peer network devices.

7. The method of claim 1, wherein selecting according to the predetermined priority order of selection includes:
   if the network device is not configured with the identification information indicating the one or more time servers:
      sending, into the enterprise network, the multicast request for the network time protocol service; and
      if a response to the multicast request is received by the network device, selecting the time server based on information contained in the response to the multicast request.

8. The method of claim 1, further comprising:
   based on the predetermined priority order, selecting a time service mechanism from among a plurality of time service mechanisms that include one or more of:
      obtaining the identification information of the one or more time servers using a link layer discovery protocol,
      connecting to an Internet network time protocol server, or
      detecting network time protocol packets sent via multicast.

9. The method of claim 8, wherein selecting the time service mechanism is periodically repeated.

10. A network device comprising:
    a network interface configured to enable network communications in a network by sending packets into the network or receiving packets from the network;
    a processor coupled to the network interface, the processor configured to:
       select one or more time servers, to use for establishing a timing reference for the network device, according to a predetermined priority order of selection that begins with determining whether the network device is configured with identification information indicating one or more time servers to be used;
       in response to the network device not being configured with the identification information of the one or more time servers, cause to communicate with a network management protocol server to obtain the identification information of the one or more time servers;
       in response to the network device not obtaining the identification information from the network management protocol server, send, into the network, a multicast request for a network time protocol service; and
       establish the-timing reference for the network device using a time server selected according to the predetermined priority order of selection.

11. The network device of claim 10, wherein the processor is configured to:
    if the network device is not configured with the identification information indicating the one or more time servers:
       cause a request to be sent into the network to the network management protocol server to receive the identification information of the one or more time servers used by the network management protocol server; and
       if the identification information of the one or more time servers used by the network management protocol server is received, select at least one of the one or more time servers used by the network management protocol server.

12. The network device of claim 11, wherein the processor is configured to:
if the network device is not successful at selecting the time server based on the multicast request:
send, into the network, a link layer protocol request for the network time protocol service; and
if a response is received to the link layer protocol request, selecting the time server based on information contained in the response to the link layer protocol request.

13. The network device of claim 12, wherein the processor is configured to:
if the network device is not successful at selecting the time server based on the link layer protocol request:
attempt to connect to an Internet network time protocol server.

14. The network device of claim 13, wherein the processor is configured to:
if the network device is not successful at connecting to the Internet network time protocol server:
detect network time protocol packets sent via multicast into the network by one or more peer network devices.

15. One or more non-transitory computer readable storage media encoded with instructions that, when executed by a processor, cause the processor to:
at a network device in an enterprise network, select one or more time servers, to use for establishing a timing reference, according to a predetermined priority order of selection that begins with determining whether the network device is configured with identification information indicating one or more time servers to be used;
in response to the network device not being configured with the identification information of the one or more time servers, communicate with a network management protocol server to obtain the identification information of the one or more time servers;
in response to not obtaining the identification information from the network management protocol server, send, into the enterprise network, a multicast request for a network time protocol service; and
establish the timing reference for the network device using a time server selected according to the predetermined priority order of selection.

16. The non-transitory computer readable storage media of claim 15, wherein instructions to select according to the predetermined priority order of selection includes instructions to:
if the network device is not configured with the identification information indicating the one or more time servers:
send a request, through the enterprise network, to the network management protocol server, to receive the identification information of the one or more time servers used by the network management protocol server; and
if the identification information of the one or more time servers used by the network management protocol server is received, select at least one of the one or more time servers used by the network management protocol server.

17. The non-transitory computer readable storage media of claim 16, wherein instructions to select according to the predetermined priority order of selection includes instructions to:
if the network device is not successful at selecting the time server based on the multicast request:
send, into the enterprise network, a link layer protocol request for the network time protocol service; and
if a response is received to the link layer protocol request, select the time server based on information contained in the response to the link layer protocol request.

18. The non-transitory computer readable storage media of claim 17, wherein instructions to select according to the predetermined priority order of selection includes instructions to:
if the network device is not successful at selecting the time server based on the link layer protocol request:
attempt to connect to an Internet network time protocol server.

19. The non-transitory computer readable storage media of claim 18, wherein instructions to select according to the predetermined priority order of selection includes instructions to:
if the network device is not successful at connecting to the Internet network time protocol server:
detect network time protocol packets sent via multicast into the enterprise network by one or more peer network devices.

20. The non-transitory computer readable storage media of claim 15, wherein the network management protocol server is a Dynamic Host Configuration Protocol server.

* * * * *